United States Patent [19]

Brennesholtz et al.

[11] Patent Number: 4,914,510
[45] Date of Patent: Apr. 3, 1990

[54] METHOD FOR IMPROVING THE WHITE FIELD UNIFORMITY OF A PROJECTION COLOR TV USING CRTS HAVING INTERFERENCE FILTERS, PROJECTION COLOR TV AND CRTS RESULTING FROM THE METHOD

[75] Inventors: Matthew S. Brennesholtz, Waterloo; Raymond G. Greene, Romulus, both of N.Y.

[73] Assignee: North American Philips Corporation, New York, N.Y.

[21] Appl. No.: 289,338

[22] Filed: Dec. 23, 1988

[51] Int. Cl.$^4$ .......................... H04N 9/16; H04N 9/31
[52] U.S. Cl. ......................................... 358/60; 358/64; 313/478
[58] Field of Search ........................... 358/64, 60, 231; 313/474, 478

[56] References Cited

U.S. PATENT DOCUMENTS

| 4,245,242 | 1/1981 | Tzcka ..................................... 358/64 |
| 4,663,562 | 5/1987 | Miller et al. ........................ 358/253 |
| 4,679,069 | 7/1987 | Andrea et al. ......................... 358/60 |

FOREIGN PATENT DOCUMENTS 0273476 7/1988 European Pat. Off. .

Primary Examiner—Howard W. Britton
Assistant Examiner—Kimyen Vu
Attorney, Agent, or Firm—John C. Fox

[57] ABSTRACT

The white field uniformity of a projection color TV employing three monochrome cathode ray tubes is improved by matching the center-to-edge luminance gradient of the red-emitting and/or blue-emitting tube to that of the green-emitting tube having an interference filter. In a preferred embodiment, such matching is achieved by applying an optical filter of varying density on the outside surface of the display window of the tube.

28 Claims, 2 Drawing Sheets

U.S. Patent  Apr. 3, 1990  Sheet 1 of 2  4,914,510
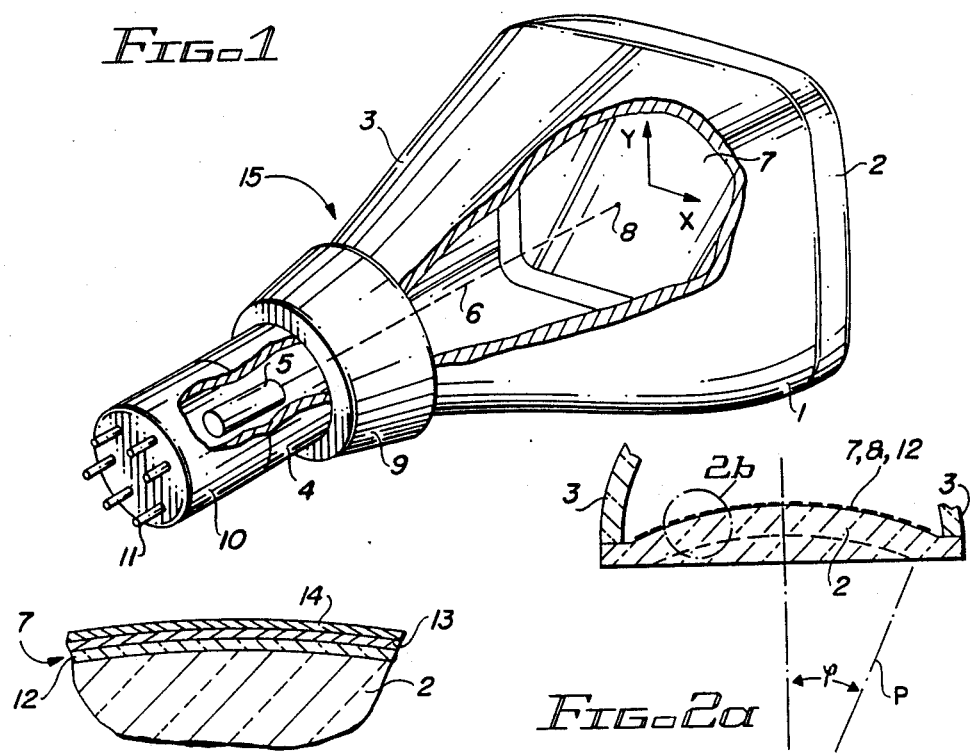
FIG-1
FIG-2a
FIG-2b
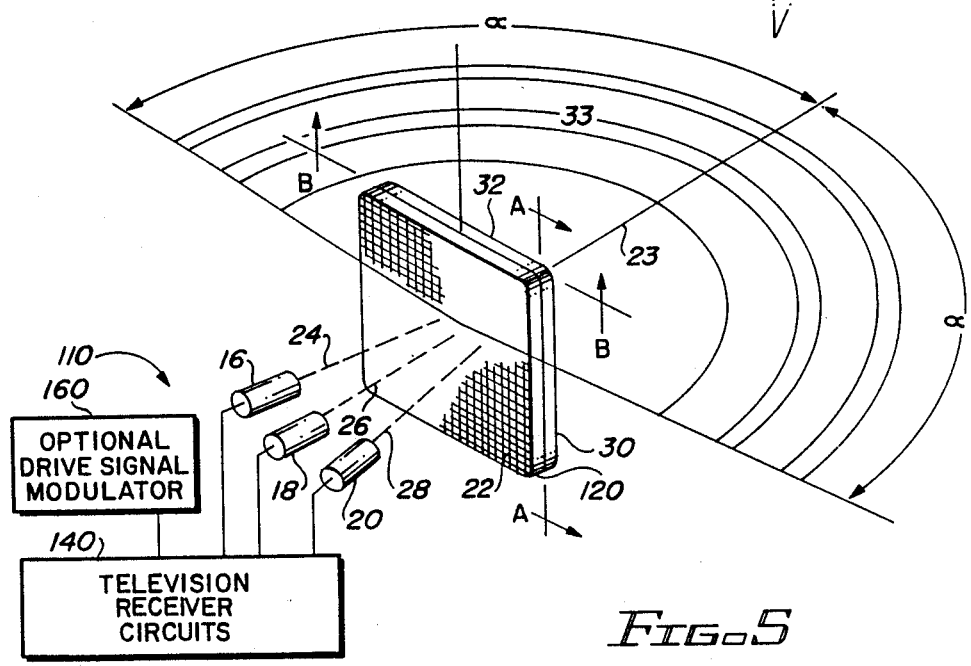
FIG-5

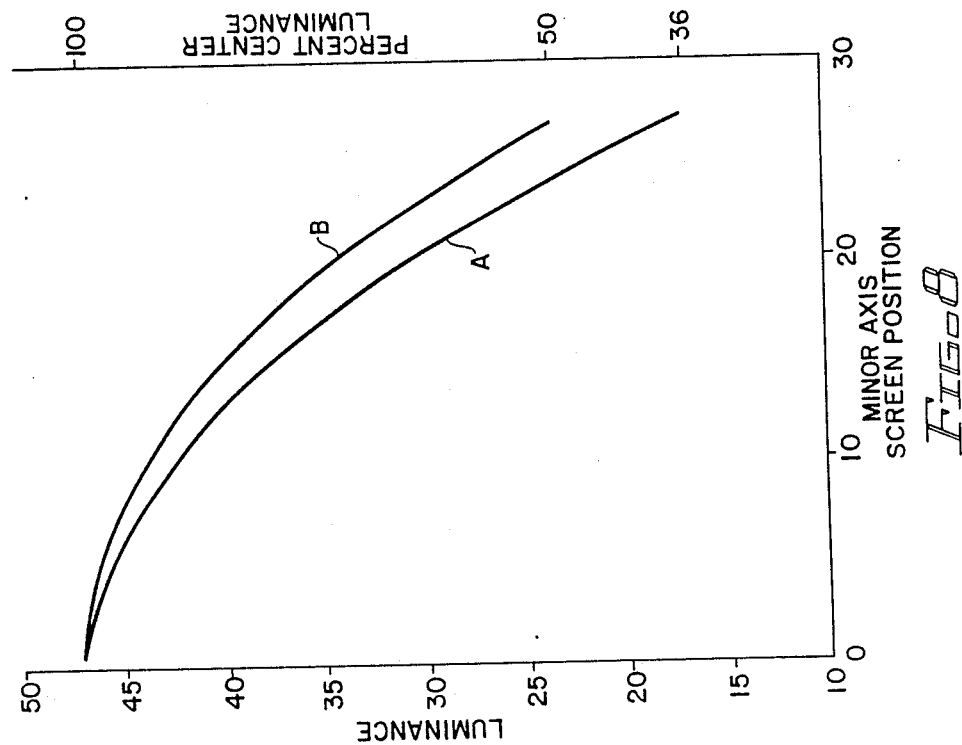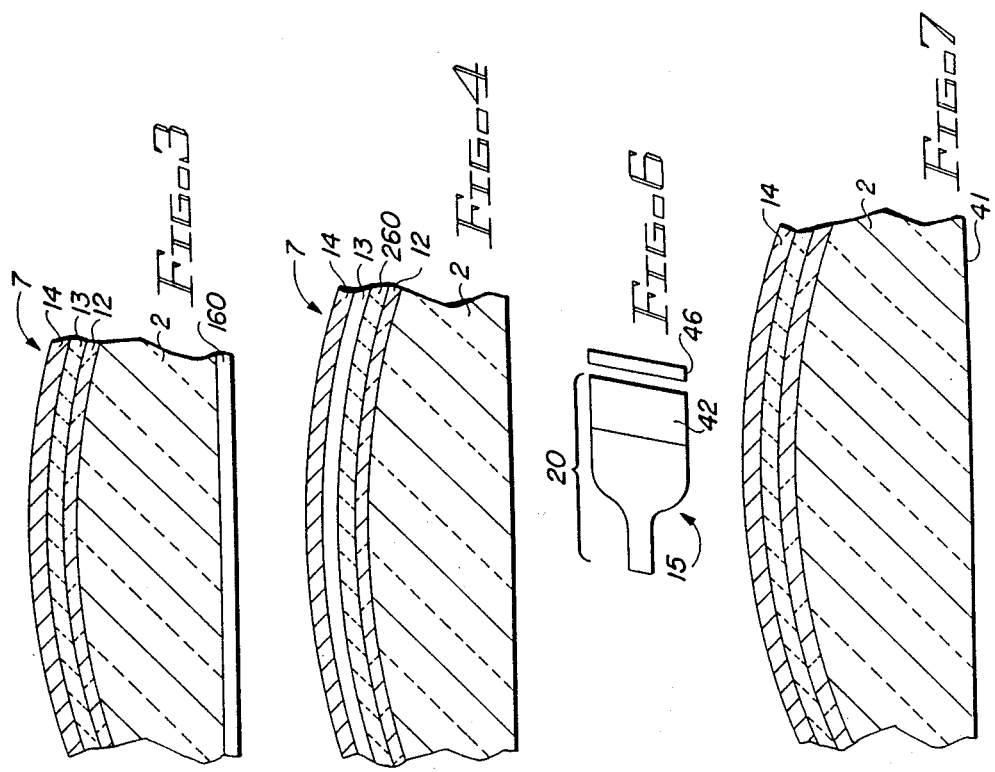

METHOD FOR IMPROVING THE WHITE FIELD UNIFORMITY OF A PROJECTION COLOR TV USING CRTS HAVING INTERFERENCE FILTERS, PROJECTION COLOR TV AND CRTS RESULTING FROM THE METHOD

CROSS-REFERENCE TO RELATED APPLICATION

Co-pending U.S. patent application, Ser. No. 288,833, filed concurrently herewith, relates to projection color television (TV) using monochrome cathode ray tubes (CRTs), at least two of which have interference filters with different numbers of layers, while the present Application relates to such TV using such CRTs, at least one of which has an interference filter.

BACKGROUND OF THE INVENTION

This invention relates to projection color television (TV) display devices using monochrome cathode ray tubes (CRTs) incorporating interference filters, and more particularly relates to a method for improving the white field uniformity of these devices, and to the resulting devices and tubes.

Monochrome cathode ray tubes for projection television employ a single electron gun mounted in the neck of the tube to focus a single electron beam on the fluorescent display screen of the tube. A deflection yoke surrounding the neck of the tube, and associated electronic circuitry, cause the beam to scan the screen as well as to vary n intensity in response to a video signal to produce a monochrome display image.

In projection color television, three such displays, each in one of the primary colors red, blue and green, are superimposed on a large projection screen to produce a full color display image. Because the images on the individual tube screens are not viewed directly, but are magnified and projected by a system of projection lenses, the individual cathode ray tubes are driven at higher loads than would be encountered for direct view tubes, in order to produce a full color display of acceptable brightness.

Projection tubes having an interference filter are described in U.S. Pat. No. 4,634,926, assigned to U.S. Philips Corporation. The filter, herein referred to as a short wave pass (SWP) filter, is composed of alternating layers of materials of high and low refractive index. The filter is designed to result in a marked increase in luminous efficiency of the tube in the forward direction, as well as improved chromaticity and contrast. Even further improvements are provided, especially in light gain in the corners of the display screen, by combining such an interference filter with an inwardly curved display window, as provided in U.S. Pat. No. 4,683,398, also assigned to U.S. Philips Corporation.

In these tubes, the interference filter is deposited directly upon the inner surface of the faceplate and the luminescent phosphor screen is deposited on the interference filter. The filter is typically composed of from 14 to 20 layers each having a thickness of about one-quarter of the central wavelength of the filter.

Such tubes with interference filters, while exhibiting a marked increase in luminous efficiency in the forward direction, as well as improved chromaticity and contrast, also exhibit greater luminance in the center than at the edges of the display, referred to herein as center-to-edge luminance gradient.

Furthermore, uncontrollable variations in the thicknesses of the filters occurring during mass production of these tubes can result in edge luminances which vary from as low as about 30 to as high as about 70 percent of the center luminance. When the red, blue and green tubes are assembled into a projection color television, the tube drivers are adjusted to result in a desired white field at the center of the screen. It can be appreciated that when red, blue and green tubes having different center-to-edge gradients are combined in a projection set, white field uniformity is increasingly degraded as the distance from the center of the screen increases.

OBJECTS AND SUMMARY OF THE INVENTION

It is a principal object of the invention to improve the white field uniformity of a multi-tube projection color television display device employing at least one monochrome tube with an interference filter.

According to one aspect of the invention, such white field uniformity is improved by altering the center-to-edge luminance gradient of at least one of the projection tubes to match that of at least one of the other tubes.

According to a preferred embodiment of the invention, the green tube employs an interference filter and the luminance gradient of the red tube is altered to match that of the green tube.

According to another preferred embodiment, the luminance gradient is altered by applying an optical filter having varying transmission from center to edge, to the outside surface of the display window.

According to still another preferred embodiment, the red and green tubes employ interference filters, and the interference filter for the red tube is formed at a thickness to result in a center-to-edge gradient smaller than that of the green tube, and this gradient is then increased to match that of the green tube.

The invention also includes a monochrome cathode ray tube for projection television having means for altering its center-to-edge luminance gradient, and a multi-tube projection color television display device having at least one such tube and at least one tube having an interference filter.

BRIEF DESCRIPTION OF THE DRAWINGS

FIG. 1 is a perspective view, partly in section, of a projection television display tube of the prior art;

FIG. 2a is a diagrammatic cross-section of a portion of the front of the display tube, showing the display window, luminescent screen and interference filter of the invention;

FIG. 2b is a detailed cross-section of a portion of the window, screen and filter of FIG. 2a;

FIGS. 3 and 4 are cross-sections similar to that of FIG. 2b, for two different embodiments of a tube of the invention having an optical matching filter;

FIG. 5 is a diagrammatic representation of a three-tube color projection television incorporating at least one display tube of the invention FIG. 6 is a diagrammatic representation of a tube/lens projector assembly including an optical matching filter of the invention;

FIG. 7 is a cross-section similar to that of FIG. 2b for a tube of the invention having an electron beam-attenuating matching layer; and FIG. 8 is a graph of luminance at the projection screen in Foot-Lamberts, and in percent of center luminance versus distance from the center of the screen in inches along the minor axis for two tubes of the prior art.

DESCRIPTION OF THE PREFERRED EMBODIMENTS

FIG. 1 is a perspective view, partly broken away, of a projection television display tube 15 according to the prior art. The tube comprises a glass envelope 1 which consists of an inwardly curved display window 2, a cone 3, and a neck 4, within which is an electron gun 5 for generating an electron beam 6. The electron beam is focused on a curved display screen 7, provided on the inside of the display window 2 to form a spot 8. The electron beam is deflected over the display screen 7 in two mutually perpendicular directions along X, Y, axes (sometimes referred to as the major and minor axes, respectively), by means of a system of deflection coils 9. Electrical connection to the gun 5 is provided through base 10 with connection pins 11.

FIG. 2a is a partial sectional view of the curved display window 2, the multi-layer interference filter 12, and the curved display screen 7. As seen in the more detailed FIG. 2b, the display screen 7 consists of a layer of luminescent material (phosphor) 13 and a thin aluminum film 14. The display window in the preferred embodiment is preferably as near spherical as possible, having a radius of curvature $\phi$. Other embodiments include aspherical shapes.

The details of the filter design are known from the teachings of U.S. Pat. Nos. 4,683,398 and 4,634,926 cited above, and are therefore not a necessary part of this description. Briefly, the filter comprises alternating layers of low refractive index and high refractive index materials, such as $SiO_2$ and $TiO_2$ having refractive indices of 1.44 and 2.35 respectively, preferred for their hardness and durability. The average optical thickness of the layers, which is equal to the physical thickness times the index of refraction of the layer, is approximately equal to $0.25\lambda f$, where $\lambda f$ is the central or cut-off wavelength of the filter, which in turn is equal to $p \times \lambda$, where p is an interger having a value between 1.18 and 1.32 and $\lambda$ is the central wavelength of the phosphor. These layers are typically formed by vapor deposition directly on the inner surface of the glass face panel until a total of from 14 to 20 layers have been deposited, increasing numbers of layers resulting in increased definition of the cut-off wavelength of the filter.

In addition to a short wave pass (SWP) filter of the type described above, the interference filter may also be in the form of a band pass (BP) filter in accordance with the teachings of co-pending patent application Ser. No. 217,259, filed July 11, 1988, assigned to the assignee of the present application.

A conventional 3-tube color projection television device is shown diagrammatically in FIG. 5, employing a rear projection screen 120. Video signals are received by television receiver circuits 140 and are projected through individual red, green and blue cathode ray tube (CRT)/lens projector assemblies 16, 18, and 20, onto the rear surface 22 of projection screen 120. The three CRT/lens projector assemblies 16, 18 and 20 each include a CRT and associated projection optics, and are arranged horizontally with respect to screen 120. The green assembly 18 is located so as to have its optical axis 26 coincide with the central projection axis, while the red and blue assemblies 16 and 20, having optical axes 24 and 28 respectively, are laterally and angularly offset from the green axis 26.

As already stated, uncontrollable variations in the thicknesses of the filters occurring during mass production of tubes can result in edge luminances which vary as much as about 30 to 70 percent of the center luminance. The most difficult to control in this respect is the green SWP filter used in conjunction with a Tb-activated phosphor. By way of example, for such a filter having 20 layers and a central wavelength of about 548 nanometers, the optical thickness is only about 2.7 microns, and the physical thickness is about 1.4 microns. Controlling this thickness to within $+$or$-1$ percent still results in a minor axis edge luminance of about $55+$or$-5$ percent of center luminance. In addition, for a given center luminance, the edge luminance of the green tube is typically lower than that of the red tube, with the result that when a three-tube projection set is adjusted at the screen center for a desired white field, the edge of the field has a magenta color. This non-uniformity of the white field becomes commercially unacceptable as the difference between edge luminances of the two tubes exceeds about 5 percent.

FIG. 8 represents graphically the center-to-edge luminance gradients along the minor axis of the projected image of typical red and green projection tubes, in which luminance in Foot-Lamberts and luminance as a percent of center luminance on the vertical axes are plotted versus distance from the center of the display screen in inches on the horizontal axis. The drives of the two tubes have been adjusted to achieve 100% of a target luminance value, about 47 Foot-Lamberts, at the screen center. Curve A representing the output of the green tube, falls to a value of about 36% of center luminance at the edge of the screen, while curve B representing the red tube, falls to about 50%.

In accordance with the invention, white field uniformity from center-to-edge can be improved by matching, to within at least 5 percent, the center-to-edge luminance gradients of the tubes for a projection set. This may be accomplished in one of several ways. The largest gradient can be reduced by reducing the center luminance or increasing the edge luminance. However, the green tube usually has the largest average gradient, and it is also the weakest tube in the system. Thus, the green tube is usually driven at or near its maximum power. Reducing the center luminance will then reduce the overall luminance of the projection set, while increasing the edge luminance may exceed the maximum drive at which optimum performance is obtained. Accordingly, it is normally preferred to match gradients by increasing the smallest gradient. On average, the red tube normally has the smallest gradient. Furthermore, since the red tube is normally stronger than the green tube, the red tube's gradient can be increased by increasing its drive toward the center, by decreasing its drive toward the edges, or by attenuating either its electron beam or light output toward the edges.

In the conventional 3-tube projection set having red, green and blue tubes, using for example, $Y_2O_3$:Eu, YAG:Tb and ZnS:Ag phosphors, respectively, the green tube is driven about four times as hard as the red tube and twice as hard at low current levels as the blue tube. As is known, these are approximate values and vary with current due to the different degrees of nonlinearity of the different phosphors. However, these values show that considerable increases in the drive levels of the red and blue tubes can be tolerated in order to compensate for any decrease in luminance caused by gradient matching.

Modulating the drive signal to achieve a gradual change in drive from center to edge can readily be achieved in a known manner by means of programmable gain amplifiers synchronized with the vertical and horizontal scan rates. The means for achieving this modulation is represented by box 160 in FIG. 5.

A gradual increase in attenuation of the electron beam toward the edges could be achieved, for example, by gradually increasing the thickness of the aluminum layer 14 toward the edges, as shown schematically in FIG. 7. (Note also in FIG. 7 that the front surface 41 of display window 2 may be flat, as well as curved, as shown in FIGS. 2, 3 and 4.) This could be accomplished, for example, in a known manner, by using a rotating dodger during vapor deposition of the aluminum layer.

Other electron beam attenuating layers normally present inside a cathode ray tube, such as a getter layer, could also be graded to achieve the same result.

Attenuation of light output can be achieved by placing an optical filter having decreased transmission towards its edges, in the light path, either inside the tube, as shown by layer 260 between interference filter 12 and phosphor screen 13 in FIG. 4, or preferably outside the tube, as shown by layer 160 on the front of faceplate 2 in FIG. 3, and by layer 46 adjacent projection optics 42 in FIG. 6. The layer could also be located on a lens surface in the projection optics.

The optical filter can, for example, be a coating or plate of varying optical density or a "half tone" type pattern consisting of alternate clear and opaque areas.

Where a half tone pattern is used, care must be taken that the pattern has sufficiently fine resolution to avoid its noticeable appearance on the projection screen. This is particularly important when the filter is inside the tube near the projection focal plane.

A technique which is attractive from the standpoint of flexibility and convenience of application, is the silk screening of a half tone pattern, such as dots of varying size and/or spacing, onto the outside of the faceplate of the tubes. A set of several silk screens representing 5 percent increments of center-to-edge gradients will allow matching of tubes over the entire range of gradients likely to be encountered.

In the alternative, filter plates can be selected from standard sets having 5 percent gradient increments, and placed adjacent one element of the projection optics.

It is also possible to attenuate the light output toward the edges by stopping down the aperture of one or more elements of the projection optics, to achieve an effect that is sometimes referred to a vignetting.

An alternative technique for producing a half tone pattern is photolithography, a technique already practiced to produce "black matrix" for direct view color cathode ray tubes. In this known technique, a photosensitive coating (resist) is selectively exposed through a photomask, whereby either the exposed portions or the surrounding portions become insoluble in a developer, depending on whether the resist is positive or negative. An opaque coating is then formed over the top of the exposed resist, and the composite is developed, whereby the soluble portions of the resist and the overlying opaque layer are removed, leaving the desired pattern.

In a three-tube projection set where interference filters are employed at least in the green and red tubes, it may be advantageous to adjust the thickness of the red tube's filter so that the range of center-to-edge gradients is entirely outside the range for the green tube. Then, matching can be achieved for every red-green tube set by increasing the gradient of the red tube.

While matching the red tube to the green tube has the most effect on white field uniformity, due to the eye's sensitivity to magenta type discolorations, the blue tube may also need matching to the red and green tube. Any technique that can be used on the red tube can also be used on the blue tube. The two tubes need not use the same gradient matching technique. For example, a silk screened neutral density filter may be used on the red tube and electronic correction on the blue tube.

We claim:

1. A method for improving the white field uniformity of a projection color television display device incorporating red, blue and green monochrome cathode ray tubes, at least one tube having an interference filter, the method comprising altering the center-to-edge luminance gradient of at least one of the tubes to match the center-to-edge luminance gradient of the tube to that of at least one of the other tubes.

2. The method of claim 1 in which the green tube has an interference filter.

3. The method of claim 1 in which center-to-edge gradient of the red tube is altered to match the center-to-edge gradient of the green tube.

4. The method of claim 3 in which the center-to-edge gradient of the blue tube is altered to match the matched center-to-edge gradients of the red and green tubes.

5. The method of claim 2 in which the red tube has an interference filter and in which the filter is formed at a thickness to result in a center-to-edge gradient smaller than that of the green tube, and the center-to-edge gradient of the red tube is then increased to match that of the green tube.

6. The method of claim 5 in which the center-to-edge gradient of the red tube is increased by applying a variable transmission optical filter to the outside surface of the display window, the transmission of which filter decreases from the center to the edge of the window.

7. The method of claim 6 in which the filter comprises a half-tone pattern.

8. The method of claim 6 in which the filter comprises a continuous layer of variable optical density.

9. A three-tube color projection television display device having red, blue and green emitting monochrome cathode ray display tubes, the tubes each comprising in an evacuated envelope a display screen on the inside of a display window in the wall of the envelope, said display screen comprising a layer of a luminescent material, and at least one of the tubes also comprising an interference filter between the luminescent material layer and the display window, characterized in that means are included for altering the center-to-edge luminance gradient of at least one of the tubes in order to match the luminance gradient of the tube to that of at least one of the other tubes, and thereby improve white field uniformity of the display.

10. The projection television display device of claim 9 in which the green emitting tube comprises an interference filter.

11. The projection television display device of claim 9 in which gradient altering means are included for the red emitting tube.

12. The projection television display device of claim 11 in which the gradient altering means are also included for the blue emitting tube.

13. The projection television display device of claim 9 in which the means comprises an optical filter.

14. The projection television display device of claim 13 in which the filter is inside the tube.

15. The projection television display device of claim 13 in which the filter is located on the outside surface of the display window.

16. The projection television display device of claim 13 in which the filter is located in the optical projection system adjacent the outside surface of the display window.

17. The projection television display device of claim 9 in which the means comprises the projection lens.

18. The projection television display device of claim 9 in which the means comprises tube drive signal modulating means.

19. The projection television display device of claim 9 in which the means comprises electron attenuation means inside the tube.

20. A monochrome cathode ray tube for projection television comprising in an evacuated envelope a display screen on the inside of a display window in the wall of the envelope, said display screen comprising a layer of a luminescent material, characterized in that means are included for altering the center-to-edge luminance gradient of the tube comprising a single layer optical filter.

21. The tube of claim 20 in which the filter is comprised of a half-tone pattern.

22. The tube of claim 21 in which the pattern is comprised of an array of spaced-apart substantially opaque dots.

23. The tube of claim 20 in which the filter is located on the outside of the display window.

24. The tube of claim 20 in which the transmission of the filter decreases from center-to-edge.

25. The tube of claim 20 which is red-emitting.

26. The tube of claim 20 which is blue-emitting.

27. The tube of claim 20 in which the filter comprises a continuous coating of varying optical density.

28. A monochrome cathode ray tube fort projection television comprising in an evacuated envelope a display screen on the inside of a display window in the wall of the envelope, said display screen comprising a layer of a luminescent material, characterized in that means are included for altering the center-to-edge luminance gradient of the tube comprising a layer of an electron beam attenuating material.

* * * * *